3,529,655
METHOD OF MAKING COMPOSITES OF MAGNESIUM AND SILICON CARBIDE WHISKERS
Garth D. Lawrence, Midland, Mich., assignor to The Dow Chemical Company, Midland, Mich., a corporation of Delaware
No Drawing. Filed Oct. 3, 1966, Ser. No. 583,946
Int. Cl. B22d 23/00
U.S. Cl. 164—97                             4 Claims This invention relates to composites of magnesium metal and silicon carbide whiskers and to a process for their preparation. It more particularly relates to a method for intimately admixing magnesium with silicon carbide whiskers without substantially modifying their physical form and to the composite products produced thereby.

The desirability of having composites of light metal reinforced with whiskers of materials such as silicon carbide, boron carbide, titanium diboride have long been recognized, particularly for aircraft and aerospace applications. Many problems have been encountered, however, such as compatibility of the metal and the whisker, means to disperse the whiskers within the metal without substantially changing the size, shape or other physical characteristics of the whiskers and methods for arranging the whiskers in the metal in other than a random pattern.

It is an object of this invention to provide a process for producing composites of magnesium and silicon carbide whiskers. Another object is to provide a process for producing composites of magnesium and silicon carbide whiskers wherein the whiskers are arranged in any predetermined pattern. A further object is to provide a process for preparing composites of magnesium and silicon carbide whiskers wherein such whiskers substantially retain their initial physical size and shape. A still further object is to provide new and useful composites of magnesium and silicon carbide whiskers. These and other objects and advantages of the present invention will become apparent from a reading of the following detailed description thereof.

It has now been discovered that composites of magnesium and silicon carbide whiskers are prepared by placing a predetermined quantity of silicon carbide whiskers in a mold having at least one opening to the atmosphere, immersing the whisker-containing mold in a bath of molten magnesium such that the opening is below the surface of the molten metal for a period of time sufficient for the molten magnesium to infilter the mold cavity and fill the remaining space therein. The mold may then be removed from the bath and the molten metal contained therein allowed to cool and solidify to form a magnesium-silicon carbide composite which may then be removed from the mold.

As used herein, the term "magnesium" is meant to refer not only to the pure metal but to mixtures and alloys thereof which contain at least 70 weight percent magnesium. Suitable magnesium alloys include AZ 31 nominally containing 3% aluminum and 1% zinc, ZK 60 nominally containing 5.5% zinc and 0.5% zirconium, AZ 92 nominally containing 9.0% aluminum and 2.0% zinc, and the like.

The silicon carbide whiskers employed herein are the minute elongated crystals of silicon carbide usually having a diameter of about 0.3 to about 3 microns and a length of about 50 to about 500 microns. Such whiskers can be placed in a mold of substantially any size or configuration provided it contains at least one opening to the atmosphere which is at least about ⅛ inch in its smallest dimension. Arrangement of the whiskers in the mold may be random or in some predetermined pattern to impart specific characteristics to the composite. Usually at least one volume percent of whiskers are required in a composite in order to appreciably improve its strength characteristics. If greater than 90 volume percent of the composite is composed of whiskers, it becomes difficult to achieve a uniform distribution of the magnesium throughout the mass of whiskers. It is usually preferred to employ from about 10 volume percent to about 40 volume percent of silicon carbide whiskers in the composite.

Prior to immersion of the whisker-containing mold into the molten magnesium bath, it is necessary that the interior of the mold and the silicon carbide whiskers contained therein be substantially anhydrous and free from volatile matter or matter which is reactive with the molten magnesium to produce a gas such as hydrogen.

The mold containing a predetermined volume and arrangement of silicon carbide whiskers is immersed in a bath of molten magnesium such that the opening or openings to the interior of the mold are below the surface of molten metal. As the molten metal enters the mold cavity, it reacts with the air contained therein to form small amounts of magnesium oxide and magnesium nitride to thereby form a vacuum and draw additional molten metal into the cavity and between the whiskers of silicon carbide. It is usually advantageous to heat the whisker-containing mold to a temperature of about that of the molten magnesium, e.g. about 1400° F., prior to immersion in the bath. This prevents any premature or localized freezing of magnesium, dries the mold and the whiskers and usually decreases the time required for infiltration of the magnesium into the mold cavity.

The time required for the molten magnesium to fill the remaining volume of the mold cavity will vary depending on the configuration of the mold, the proportion of whiskers present, temperature and the like, but in general less than 4 hours is required and usually between about 0.25 and 2 hours is sufficient.

Once the remaining volume of the mold cavity is filled with magnesium, the mold is removed from the magnesium bath, the magnesium within the mold is allowed to solidify and the composite is removed from the mold. Some composite articles may be used as they come from the mold but usually at least some trimming is desirable. If required, the composites may be machined to other shapes or dimensions.

Composites prepared according to this invention contain silicon carbide whiskers which substantially retain their physical size, shape and mechanical strength and retain the pattern in which they were placed in the mold.

One preferred procedure for preparing the composites of this invention comprises slurrying the desired quantity of silicon carbide whiskers in a liquid carrier such as ethyl alcohol and removing the carrier by vacuum filtration to form a mat of whiskers. The mat of silicon carbide whiskers thus obtained is placed in the mold and the mold is heated to about 1400° to about 1600° F. under high vacuum until all moisture, liquid carrier and other volatiles have been removed. The heated mold is then immersed in a bath of molten magnesium until all of the remaining volume is filled with magnesium whereupon the mold is removed from the bath, allowed to cool and the composite removed therefrom. A high strength composite is thereby produced which has good compatibility and bonding as well as good admixture between the metal and the whiskers and metal.

The following examples are provided to further illustrate the invention but they are not to be construed of limiting to the scope thereof.

EXAMPLE 1

A slurry of 100 cc. of denatured ethyl alcohol and 3 gm. of commercially available silicon carbide whiskers having a length of from 1–3 microns was formed and poured into a vacuum filter. After removal of a major portion of the alcohol, a quantity of the mat of whiskers was placed in a 1 inch x 2 inch x 0.25 inch mild steel mold to occupy 10% of the volume thereof. The mold was then heated to 1600° F. under a pressure of $1 \times 10^{-5}$ mm. of mercury for 12 hours to remove the moisture, alcohol and other volatiles therefrom.

After the mold had cooled to a temperature of about 1400° F., it was immersed in a bath of molten commercially ingot magnesium having a temperature of about 1400° F. for a period of 2 hours. At the end of this period the mold was removed from the bath and allowed to cool to room temperature.

After removal from the mold, the composite was found to be completely sound with evidence of good bonding between the SiC whiskers and the Mg matrix. The composite had a tensile yield strength of 15,800 p.s.i., an ultimate tensile strength of 16,900 p.s.i., a compression yield strength of 23,000 p.s.i., and a compressive strength of 44,000 p.s.i.

In a similar manner, a composite was prepared which contained 30 volume percent of silicon carbide whiskers. This composite was found to have a compressive yield strength of 43,000 p.s.i. and an ultimate compressive strength of 63,500 p.s.i.

As a comparison, a magnesium molding was prepared in the same manner but containing no silicon carbide whiskers. It was found to have a tensile yield strength of 6,700 p.s.i., an ultimate tensile strength of 9,500 p.s.i. and a compression yield strength of 7,000 p.s.i.

In a similar manner and employing the same mold, a composite of magnesium and silicon carbide whiskers is prepared by placing the whiskers uniaxially in the mold. The composite produced thereby has silicon carbide whiskers uniaxially oriented within the magnesium matrix.

Various modifications can be made in the present invention without departing from the spirit or scope thereof for it is understood that I limit myself only as defined in the appended claims.

I claim:

1. A process for the preparation of composites of magnesium and silicon carbide whiskers which comprises providing a mold having at least one opening to the atmosphere and containing silicon carbide whiskers in an amount of from about 1 to about 90 volume percent of the interior volume of the mold, said silicon carbide whiskers and the interior of said mold being substantially anhydrous, immersing said whisker-containing mold into a bath of molten magnesium such that all openings in said mold are below the surface of the molten magnesium for a time sufficient for the magnesium to fill the remaining volume of the mold cavity, removing the filled mold from the molten magnesium bath and allowing the magnesium in the mold to solidify.

2. The process of claim 1 wherein 10 to 40 volume percent of the mold is filled with silicon carbide whiskers.

3. The process of claim 1 wherein the silicon carbide whiskers are uniaxially aligned in the mold.

4. The process of claim 1 wherein the mold containing silicon carbide whiskers is heated to a temperature of about 1400° F. prior to immersion in the molten magnesium bath.

References Cited
UNITED STATES PATENTS

| | | | |
|---|---|---|---|
| 2,809,407 | 10/1957 | Thomson et al. | 164—98 X |
| 3,352,650 | 11/1967 | Goldstein et al. | 164—91 X |
| 3,364,976 | 1/1968 | Reding et al. | 164—98 X |
| 3,396,777 | 8/1968 | Reding | 164—97 |
| 3,166,415 | 1/1965 | Conant. | |
| 3,230,079 | 1/1966 | Conant | 75—168 |
| 3,409,467 | 11/1968 | Foley | 29—472.9 X |

J. SPENCER OVERHOLSER, Primary Examiner

V. RISING, Assistant Examiner